United States Patent [19]

Petrone

[11] Patent Number: 5,439,032

[45] Date of Patent: Aug. 8, 1995

[54] INFLATABLE GAS PIPELINE STOPPER WITH DUAL AIR BAG

[76] Inventor: Joseph Petrone, 95 James Dr., Ringwood, N.J. 07456

[21] Appl. No.: 294,372

[22] Filed: Aug. 23, 1994

Related U.S. Application Data

[63] Continuation-in-part of Ser. No. 176,043, Dec. 30, 1993.

[51] Int. Cl.⁶ .............................................. F16L 55/12
[52] U.S. Cl. ........................................ 138/93; 138/89; 138/91; 137/318
[58] Field of Search ....................... 138/89, 93, 94, 97, 138/91; 137/317, 318, 315

[56] References Cited

U.S. PATENT DOCUMENTS

| 539,568 | 5/1895 | Bride | 138/93 |
|---|---|---|---|
| 628,726 | 7/1899 | Schultz . | |
| 740,795 | 10/1903 | Behringer . | |
| 1,590,186 | 6/1926 | Fanselow | 137/318 |
| 1,760,750 | 4/1928 | Goodman . | |
| 1,946,138 | 2/1934 | Gardner | 137/76 |
| 2,976,191 | 3/1961 | Weston | 138/93 |
| 3,019,819 | 2/1962 | Ankarlo | 138/93 |
| 3,805,844 | 12/1972 | Bacon | 138/93 |
| 3,842,864 | 10/1974 | Riegel et al. | 138/93 |
| 3,973,584 | 8/1976 | McKinnon | 137/318 |
| 4,013,097 | 3/1977 | Calandra | 738/93 |
| 4,079,755 | 3/1978 | Van der Lans | 138/93 |
| 4,155,373 | 5/1979 | DiGiovanni | 137/15 |
| 4,890,483 | 1/1990 | Vetter | 138/93 |

FOREIGN PATENT DOCUMENTS

| 20301 | 5/1907 | United Kingdom . | |
| 188695 | 11/1922 | United Kingdom . | |
| 1245254 | 9/1971 | United Kingdom | 347/130 |

*Primary Examiner*—James E. Bryant, III
*Attorney, Agent, or Firm*—Weingram & Zall

[57] ABSTRACT

An inflatable gas pipeline stopper is provided for stopping gas from flowing through a broken gas pipeline while effecting repairs of the gas pipeline. The invention includes an elongated cylindrical stopper housing for attachment to a gas pipeline in an air tight engagement which may be accomplished through a commercially available drilling and tapping machine and by an air tight clamp assembly. Within the stopper housing extend a pair of moveable bag inserting and retracting plunger assemblies including rigid air pipes which are attached to an air source at the upper ends thereof and to inflatable air bags at the bottom ends thereof. The moveable bag inserting and retracting plunger assemblies including the rigid air pipes are inserted through the stopper housing to extend into the gas pipeline, such that one air bag is pointed in an upstream direction within the gas pipeline and the other air bag is directed to a downstream location of the gas pipeline, both air bags being inserted through the same tap hole in the gas pipeline. Then the air bags may be inflated to stop the flow of gas from the gas pipeline. The stopper housing includes a valve means for permitting venting of gas between the upstream and downstream air bags through the same tap hole through which the air bags are inserted into the gas pipeline.

20 Claims, 4 Drawing Sheets

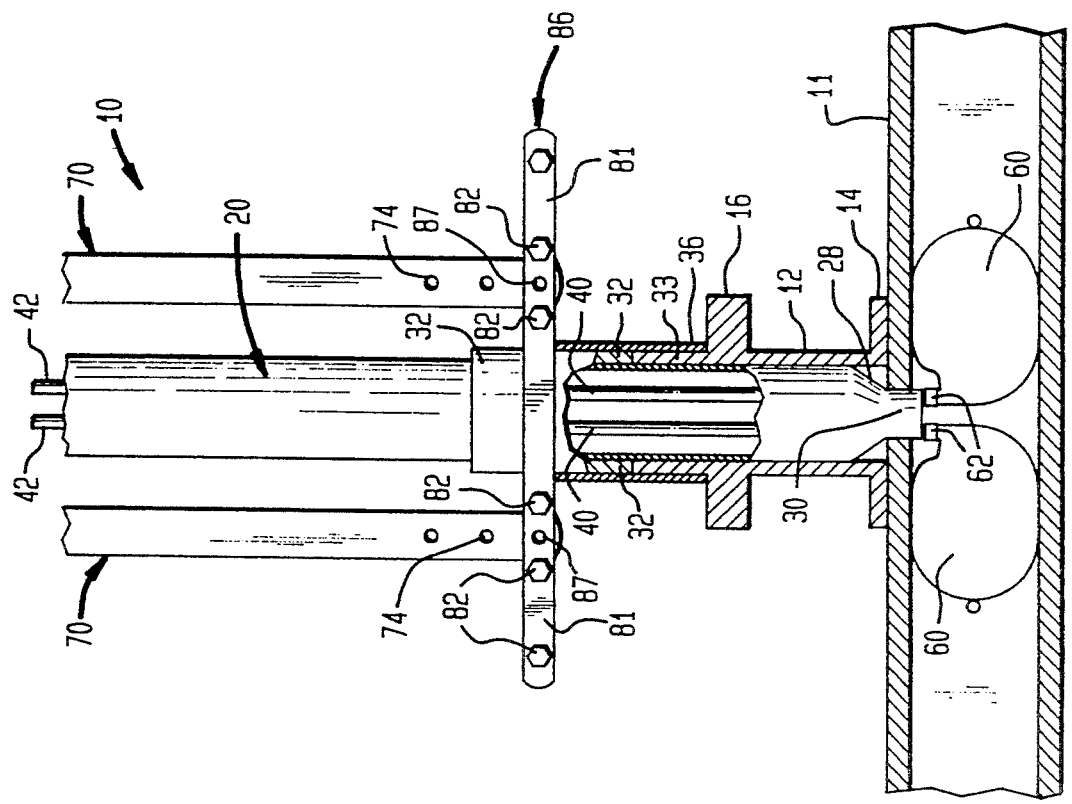
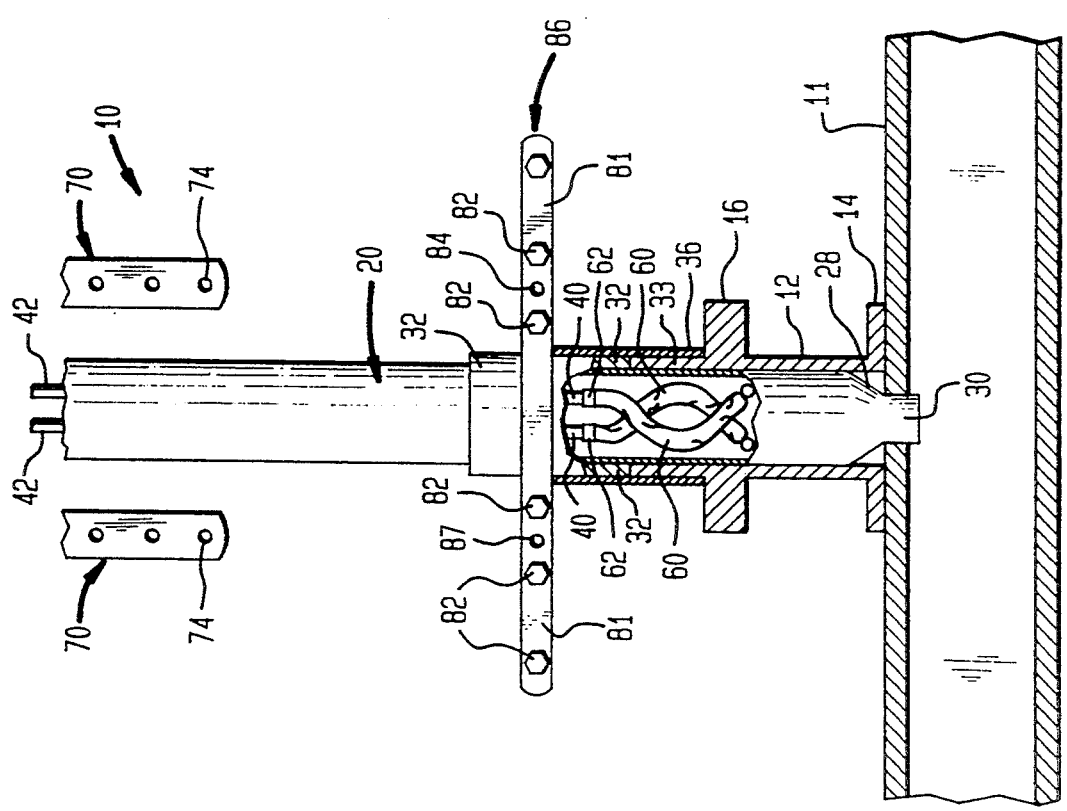

5,439,032

INFLATABLE GAS PIPELINE STOPPER WITH DUAL AIR BAG

BACKGROUND OF THE INVENTION

RELATED INVENTIONS

This is a continuation-in-part of application Ser. No. 08/176,043 filed on Dec. 30, 1993.

FIELD OF THE INVENTION

The INFLATABLE GAS PIPELINE STOPPER of the present invention is used to stop gas flow through a broken gas pipeline to permit repairs to be made on the gas pipeline and more specifically to an inflatable gas pipeline stopper having dual inflatable air bags for stopping low pressure gas flow through a gas pipeline.

DESCRIPTION OF THE PRIOR ART

There have been many attempts in the past to provide an effective inflatable air bag type gas pipeline stopper to prevent low pressure gas from flowing through a broken gas pipeline to permit repairs to be made to the broken gas pipeline. Currently the standard procedure for achieving this requires tapping a hole in the gas pipeline to permit an inflatable stopper to be inserted into the pipeline. One of the devices used to cut a hole in the gas main is commonly known as a Mueller Co. Drilling and Tapping machine. The Mueller machine, as well as most other drilling and tapping machines made by other manufacturers, is generally cylindrical and extends up from its base. Upper ears are provided on the Mueller machine for supporting bolts that interconnect with a chain which extends around the pipe to secure the Mueller machine to the gas pipe. The Mueller machine provides an airtight assembly with the gas pipe and accepts a drilling tool for drilling a hole through the pipe and a tapping tool for cutting internal threads therein. Thereafter, the Mueller machine is removed and an inflatable air bag type gas pipeline stopper may be inserted into the tap hole. When the Mueller machine is removed from the gas main and during the insertion of the inflatable air bag type stopper, gas is continuously escaping from the tap hole.

In order to prevent gas from continuously escaping from the tap hole, it is necessary to weld an expensive flange onto a steel main prior to attaching the Mueller machine to it and then use a mechanical device inserted through the Mueller machine to stop the flow of gas in the pipeline. This procedure, designed for high pressure gas mains, is costly and time consuming when used on low pressure gas mains, however, there is no alternative low cost method currently available.

It is a common safety practice of all utilities when stopping off low pressure gas mains to use two inflatable type pipeline stoppers in series, one facing upstream and the other facing downstream, with a pipe positioned therebetween for venting into the atmosphere any gas that escapes past the upstream bag so that it will not seep into the section of pipe being worked on in the downstream area since this would cause a serious hazard due to the fact that welding is typically required to repair or replace the gas main. Since many of the older cast iron and steel gas mains have irregular and rusty interiors it is often difficult to get a gas tight seal. Therefore, two bags are always used with a vent between them. Furthermore, in the event that one inflatable pipeline stopper should rupture, there is always a backup. It should be noted that this double bagging system is applied to all low pressure steel, cast iron and even plastic gas mains.

Importantly, all of the inflatable air bag type pipeline stoppers in the prior art comprise a single air bag. Therefore, to effectively stop gas flow through a low pressure gas pipeline, two separate gas pipeline stoppers must be used on each side of the break in the gas pipeline, for a total of four separate gas pipeline stoppers. Further, a vent must be positioned between each pair of stoppers to vent gas buildup therebetween. Accordingly, a total of three holes, must be drilled into the low pressure gas pipeline on each side of the break in the gas pipeline. This typically requires drilling and tapping a number of holes and digging a rather long trench through the ground to reach the various areas of the gas pipeline. This procedure is very time consuming and costly to the utility company. None of the prior efforts have effectively reduced the need for more than one gas pipeline stopper on each side of a break in a low pressure gas pipeline or the requirement that a plurality of holes must be drilled in the gas pipeline to stop the flow of gas therethrough. These prior attempts include:

Gardner, U.S. Pat. No. 1,946,138, discloses a pneumatic stopper for a gas pipe including an air-bag for stopping the pipe. The device includes a tubular housing and an inflatable bag, interconnected with an air tube which extends within the tubular housing. The air tube and bag may be moved downward with respect to the tubular housing to extend into the pipe after the housing has been threadably attached to the pipe. The air bag may then be inflated to stop the pipe.

Ankarlo, U.S. Pat. No. 3,019,819, discloses a flow stopping apparatus for a gas pipe comprising a device that is inserted into a small lateral opening formed in the pipe. The device includes a frame structure which, in a collapsed condition, is elongated and relatively narrow and which is constructed such that the peripheral portions thereof may be forced into a substantially circular shape after insertion of the stopping device into the pipe. An inflatable tube is inserted into the expansible frame for expanding the stopping device within the gas pipe.

Bacon, U.S. Pat. No. 3,805,844, discloses a plugging device for a pipeline having a tapping means, an expandable bag that may be expanded with water and means to create a freezing temperature to freeze water and expand the bag to plug the pipe.

Riegel et al., U.S. Pat. No. 3,842,864, discloses a line stopper comprising a housing that can be mounted to a conventional pipe tapping machine and a bag insertion assembly mounted in the housing. The insertion assembly includes a slidable insertion tube and an inflatable bag connected at the lower end thereof. The bag has a rigid neck connected by a knuckle means to the insertion tube to enable the bag to be pivoted into the pipe. The housing is secured to the valve assembly by two pairs of ears which extend outward from the base and which are clamped to the valve assembly by bolts. When the bag is placed into the pipe the insertion tube covers the edge of the hole in the pipe to prevent abrasion between the bag and the edge of the hole in the pipe.

McKinnon et al., U.S. Pat. No. 3,973,584, discloses a piercing valve for tapping pipelines for adjusting pressurized gas. The device includes upper and lower blocks with registering grooves assembled about a pipeline. A piercing needle on the upper block is moved downwardly to pierce the pipeline. The piercing needle is then moved upward to provide communication through the pierced hole into an upper transfer passageway in the upper block.

Calandra, U.S. Pat. No. 4,013,097, discloses an apparatus for damming the flow of fluid in a pipeline comprising an inflatable bladder wherein an outer bag of the bladder and an inner bag of the bladder are separated by fluid. The device is placed within a pipe and a bladder is inflated forcing the outer bag, through the liquid, to seal the pipeline.

Van der Lans, U.S. Pat. No. 4,079,755, discloses an inflatable pipe plug having a series of reinforcing strips of rubber sandwiched between inner and outer molded rubber members. The device includes a metal head and metal cap, having an air inlet therein, attached to the metal head to complete the assembly.

DiGiovanni, U.S. Pat. No. 4,155,373, discloses a method for shutting off gas in plastic pipes including a balloon-type stopper which may be inserted into the pipe and inflated to block the flow of gas. A ringlike compression seal is provided to prevent the escape of gas around the cutting tool during the cutting operation and to prevent gas leakage when the stopper is inflated within the pipe. The device includes a cylinder having an inflatable balloon therein which may be slid down and into the pipe and inflated by pump means.

None of these prior efforts provide the advantages or benefits of the present invention, e.g. reducing the number of holes that must be drilled into a pipe to stop gas flow therethrough. Additionally, none of these prior efforts teach or suggest using dual air bags extending from one gas pipeline stopper with both air bags being inserted through the same tap hole cut into a gas main to provide a seal to stop the flow of gas through a gas pipeline. Nor do any of these references teach a means of venting gas escaping past the upstream air bag through the same tap hole. Furthermore, prior art efforts do not suggest or teach the use of dual air bag type pipe stoppers capable of being inserted or used through conventional gas tight drilling and tapping machines thereby preventing gas from continuously escaping during these procedures.

OBJECTS AND SUMMARY OF THE INVENTION

It is a primary object of the present invention to provide a gas pipeline stopper that reduces the amount of holes that need to be drilled into a gas pipeline to stop the flow of gas through the gas pipeline.

It is an object of the present invention to provide one gas pipeline stopper which may be used to stop the flow of gas in a steel, cast iron or a plastic gas pipeline.

It is another object of the invention to provide a gas pipeline stopper having two air bags, extending from the device for stopping the flow of gas through a gas pipeline, capable of being inserted into the gas main through only one tap hole cut into the gas main.

It is even another object of the present invention to provide a gas pipeline stopper having dual directional air bags for extending into a gas pipe, in a proper direction, for stopping the flow of gas through a gas pipeline.

It is still another object of the present invention to provide a gas pipeline stopper having dual directional air bags which extend from the gas pipeline stopper in opposite directions into the gas pipeline.

It is a further object of the present invention to provide a gas pipeline stopper having dual air bags and a means for venting gas from the space between the dual air bags through the same tap hole through which said dual air bags are inserted into a gas main.

It is still a further object of the present invention to provide an inflatable air bag type gas pipeline stopper that may be used with a conventional Mueller machine drilling and tapping apparatus without the necessity of welding a costly flange onto a steel gas main.

It is also an object of the present invention to provide a gas pipeline stopper with stabilization cords for stabilizing the gas pipeline stopper with respect to a Mueller machine or drilling and tapping machines sold by other manufacturers to which it is connected.

It is another object of the present invention to provide a gas pipeline stopper that may be used with a conventional Mueller machine or drilling and tapping machines sold by other manufacturers and in which an airtight seal can be easily effected between the gas pipeline stopper and the Mueller machine or other similar type machines.

It is even a further object of the present invention to provide a gas pipeline stopper with dual inflatable air bags which air bags may be rapidly deflated.

It is yet a further object of the present invention to provide a gas pipeline stopper with dual inflatable air bags wherein the air pressure within the air bags may be monitored.

It is even another object of the present invention to provide a gas pipeline stopper having dual air bags and a venting means for venting gas between the dual air bags, which venting means may be manually controlled from the exterior of the gas pipeline stopper.

It is yet another object of the present invention to provide a gas pipeline stopper with dual directional air bags wherein the direction that the air bags extend in the gas pipeline can be controlled and indicated from the exterior of the gas pipeline stopper.

It is yet another object of the present invention to provide a gas pipeline stopper having dual air bags wherein the gas pipeline stopper has a protective collar for preventing the air bags from contacting the abrasive edges of a hole drilled in a gas pipeline.

These objects and advantages are achieved by the inflatable gas pipeline stopper of the present invention, which is used to stop gas flowing through a pipeline when effecting repairs of the pipeline. The invention functions in connection with a standard Mueller machine or drilling and tapping machines sold by other manufacturers used to drill a hole in a gas pipeline. The invention includes a cylindrical stopper housing that is inserted into a Mueller machine or other similar type machines. A stuffing box is provided so that there is an air tight fit between the gas pipeline stopper and the Mueller machine. Within the stopper housing extend two moveable bag inserting and retracting plunger assemblies attached to an air source at the tops thereof, and two inflatable air bags attached to the bottom ends thereof. Currently used or patented devices do not have these features. After the device is inserted into the Mueller machine or other similar type machines, and fastened thereto, the moveable bag inserting and retracting plunger assemblies are pushed through the housing to extend into the gas pipeline. Air is then pumped through rigid air pipes of the moveable bag inserting and retracting plunger assemblies to inflate the air bags to stop the flow of gas through the gas pipeline. The rigid air pipes are pushed into and retracted with respect to the housing and the gas pipeline by means of adjustable handles extending from the moveable bag inserting and retracting plunger assemblies along the exterior of the stopper housing and which may be unhooked at their bottom supports so that they can slide up and down to push into or retract the rigid air pipes into or from the gas pipeline. Additionally, two removable assemblies containing an air pressure gauge and a means of inflating and deflating are provided on top of the moveable bag inserting and retracting plunger assemblies for measuring the air pressure in the inflatable bags.

The inflatable gas pipeline stopper of the present invention may be used with various size gas mains and holes tapped into the gas pipeline by virtue of a series of removable adaptors and protective collars at the base of the cylindrical stopper housing to extend into the various diameter holes tapped into a gas pipeline. The cylindrical stopper housing also contains a valve means for permitting the venting of any gas that gets past the upstream inflatable bag, the venting being accomplished through the same hole tapped in a gas pipeline through which the dual inflatable air bags are inserted. This gas can thus be vented into the atmosphere. Currently used devices do not have this feature.

Additionally, two restraining cables extending between the cylindrical stopper housing and a Mueller machine or other similar type machines prevent the entire device from accidentally sliding out of the Mueller machine. Currently used devices, such as the Gardner Goodman Stopper which cannot be used with a Mueller or other similar type Drilling & Tapping Machine, or other patented devices do not have this feature.

When the stop off is completed and the air bag must be retracted into the air bag inserting cylinder, it is extremely difficult to retract the air bag because it remains partially inflated. The inflatable gas pipeline stopper of this invention overcomes this by means of a venturi pump adaptor connection at the top of each moveable inserting and retracting plunger assembly. Currently used devices do have this feature.

Insertion and use of both inflatable air bags as well as venting are all accomplished through a single tap hole in the gas main rather than through a plurality of tap holes as is now common practice. Furthermore, this stopping off procedure may be accomplished while the gas main is under pressure without gas escaping from the tap hole since this present invention is capable of being adapted to any existing air-tight drilling and tapping machines currently in use.

BRIEF DESCRIPTION OF THE DRAWINGS

Other important objects and features of the invention will be apparent from the following detailed description of the invention taken in connection with the accompanying drawings, in which:

FIG. 3 is a partially cut away front plan view of the gas pipeline invention shown in FIG. 1 attached to a Mueller machine which is attached to a gas pipeline showing the inflatable air bags within the cylindrical housing.

FIG. 4 is a partially cut away front plan view of the gas pipeline stopper invention shown in FIG. 3 with the dual air bags extended into the gas pipeline and inflated.

DETAILED DESCRIPTION OF THE INVENTION

Figure 1:
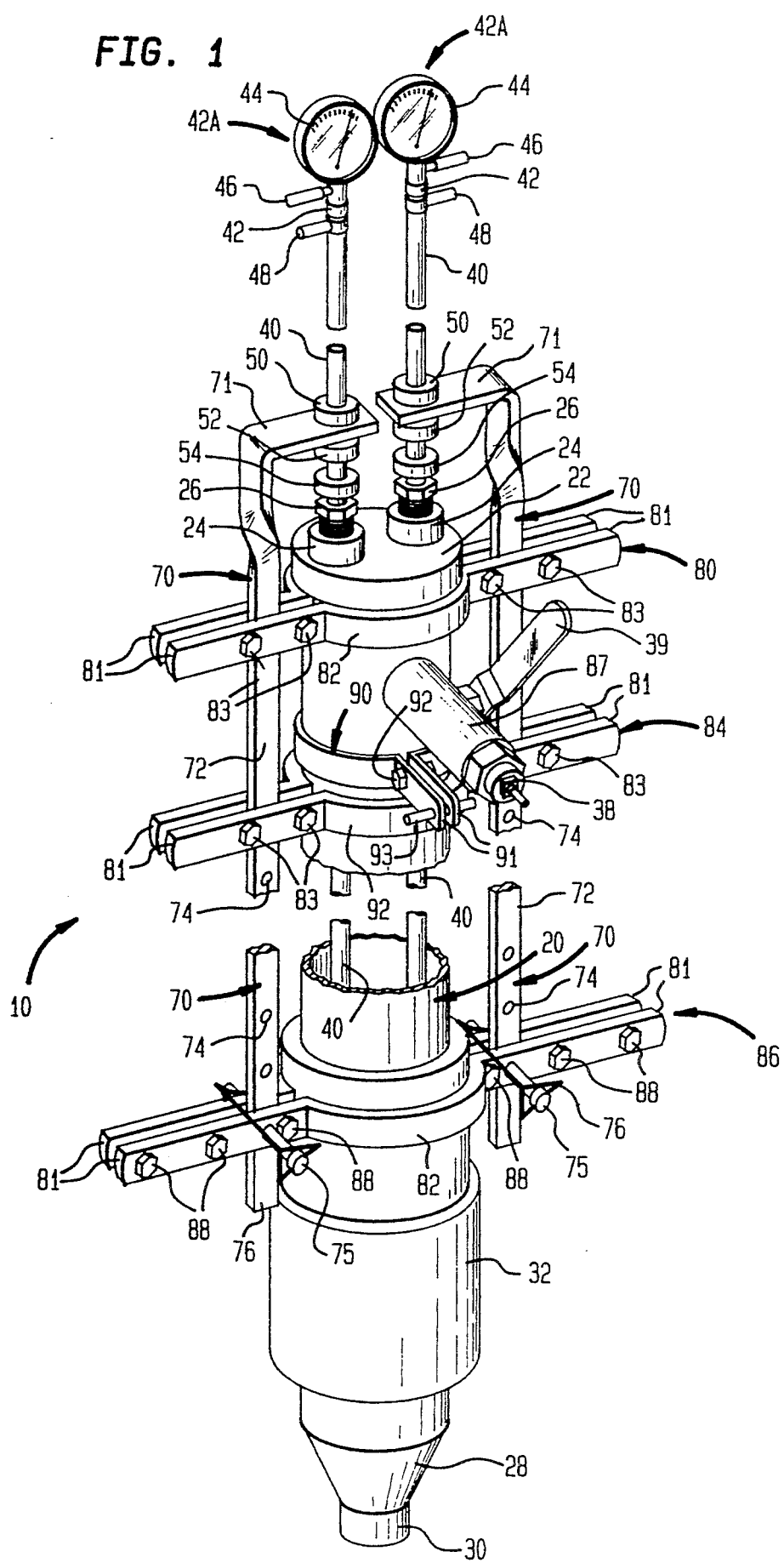
FIG. 1 is a perspective view of the gas pipeline stopper of the present invention.

The gas pipeline stopper of the present invention is indicated generally in FIGS. 1-4 by reference numeral 10. Referring to FIG. 1, the inflatable gas pipeline stopper 10 includes a cylindrical housing 20 comprising an elongated cylinder having a top 22 at one end and a removable reducer 28 at the other end. The removable reducer reduces the cylindrical housing 20 to a smaller diameter and terminates in insertion tip 30 which may be inserted into a tap hole drilled in a gas pipeline. The reducer 28 is preferably threadibly engageable with the cylindrical stopper housing 20 and various reducers of different dimensions may be used on the cylindrical stopper housing 20 depending upon the size of the tap hole drilled in the gas pipeline.

Extending from the cylindrical stopper housing 20 of the inflatable gas pipeline stopper 10 is a gas pressure relief valve 37 for relieving gas pressure within the housing 20 and venting the gas into the atmosphere. The pressure relief valve 37 includes a pressure relief nozzle 38 through which gas may be relieved and vented into the atmosphere and a pressure relief handle 39 which controls the relief of gas through the pressure relief valve 37 and the pressure relief nozzle 38.

The inflatable gas pipeline stopper invention 10 further includes dual moveable air bag inserting and retracting plunger assemblies having a number of components, including rigid air pipes 40 that extend into the housing 20 through aperture plugs 24 in the top of the housing 22. Aperture plugs 24 coact with aperture stoppers 26 and the rigid air pipes 40 to provide an airtight seal between the rigid air pipes 40 and the housing 20.

The rigid air pipes 40 include removable inflating and deflating and pressure monitoring assemblies, generally indicated at 42A, at the upper ends thereof which have air pressure gauges 44. The removable inflating and deflating and pressure monitoring assemblies 42A include intake valves 46 for receiving air from an external air source and valves 42 for communicating with the rigid air pipes 40. The removable bag inflating and deflating and pressure monitoring assemblies 42A are attached to the top of the moveable rigid air pipes 40 by means of a quick disconnect coupling thus facilitating easy removal of the entire assembly.

Also provided on the upper end of the air pipes 40 are adjustable directional bag indicators 48 which can be rotated on the rigid air pipes 40 to positions corresponding to the direction of the directional air bags, which will be described hereinafter, to indicate the direction to which the directional air bags are pointed when ejected into the gas main. As shown in FIGS. 3 and 4, the lower ends of the rigid air pipes 40 are interconnected with the directional air bags 60 by means of air bag connectors 62.

Interconnected with the rigid air pipes 40, as part of the removable bag inserting and retracting plunger assembly, are plunger handles generally indicated as 70. The plunger handles 70 include a horizontal portion 71 interconnected with the rigid air pipes 40 and a vertical portion 72 extending along opposite exterior sides of the cylindrical stopper housing 20. The plunger handles 70 are attached and held in place on the rigid air pipes 40 by means of upper and lower rigid air pipes collars 50 and 52 which prevent slidable movement of the horizontal portion 71 of plunger handles 70 with respect to the rigid air pipes 40. Bottom rigid air pipes collars 54 are also provided on the rigid air pipes 40 to coact with the aperture stopper 26 to restrain downward movement of the rigid air pipes 40 beyond a required level.

The vertical portions 72 of plunger handles 70 extend along opposite sides of the cylindrical stopper housing 20, and are maintained in position by handle guides, namely upper fixed handle guide 80, mid fixed handle guide 84 and lower moveable handle guide with collar 86. The handle guides 80, 84 and 86 comprise opposing members, each having semi-circular housing fittings 82 and horizontal ears 81 extending therefrom. The semi-circular housing fittings 82 extend about the cylindrical stopper housing 20 and the horizontal ears 81 extending therefrom face each other with a gap therebetween. Collar bolts 88 secure the opposing horizontal ears 81 of the collar together. Opposing horizontal ears 81 and are spaced apart to permit the vertical portions 72 of the plunger handles 70 to extend therebetween. Accordingly, the handle guides 80, 84 and 86 serve to guide the plunger handles 70. The lower moveable handle guide with collar 86 includes a collar positioner aperture 87 (FIG. 3) through which positioning bolt 75 may extend. Further, the vertical portion 72 of the plunger handles 70 include positioning apertures 74 extending along a lower end of the plunger handles 70. Accordingly, these plunger positioning apertures 74 may be aligned with the collar positioner aperture 87 of the lower moveable handle guide with collar 86 so that positioning bolt 75 may extend through the positioner apertures 87 and a plunger positioning aperture 74 to restrain movement of the plunger handle 70 and thereby lock the entire moveable bag inserting and retracting plunger assembly 40, in a desired position. Further, a positioning bolt lock 76 is provided to lock the positioning bolt 75 in place.

Figure 2:
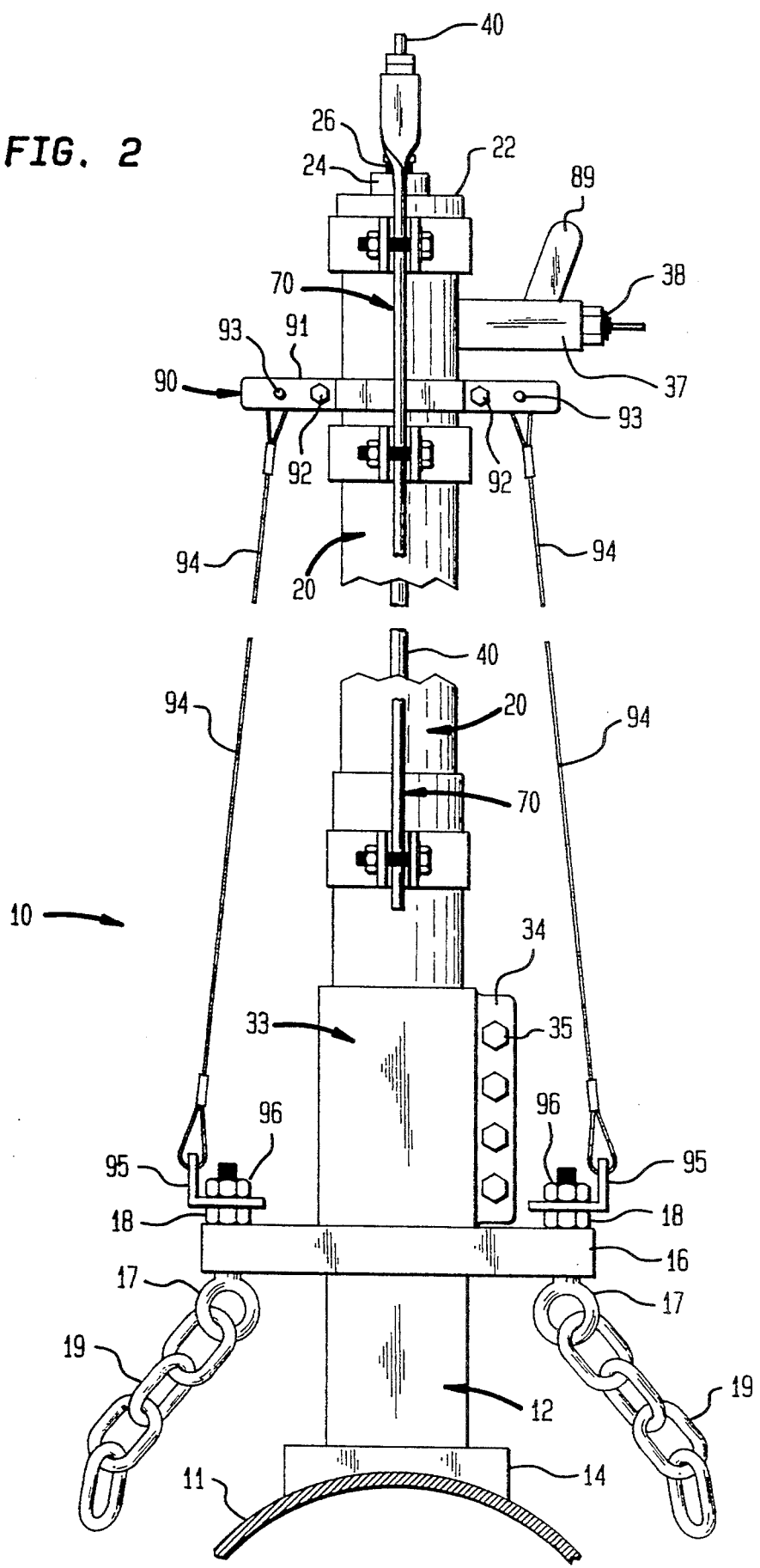
FIG. 2 is a side plan view of the gas pipeline stopper of the present invention shown in FIG. 1 attached to a Mueller machine which is attached to a gas pipeline.

The cylindrical stopper housing 20 of the inflatable gas pipeline stopper be is attachable to a pipe 11, as shown in FIG. 2, by means of a Mueller machine 12 or any drilling and tapping machines sold by other manufacturers. The Mueller machine is interconnected with the pipe 11 by means of a removable flange 14 which is a component of the Mueller machine. The Mueller machine 12 includes ears 16 at an upper end thereof which include apertures for accepting eye bolts 17 or other attachment means for interconnecting with a chain 19 that extends around the pipe 11 to secure the Mueller machine 12 to the pipe 11. The eye bolt 17 extends through the aperture in the Mueller machine 12 and is fastened thereto by means of an eye bolt nut 18.

The cylindrical stopper housing 20 of the gas pipeline stopper invention 10 may include a rubber like seal collar 32, (FIG. 1) wrapped about a lower end of the cylindrical stopper housing 20. When the lower end of the cylindrical stopper housing 20 is inserted into the Mueller machine 12, the rubber like sealing collar 32 fits into a sealing clamp, generally indicated at 33, which clamp also extends about an upper portion of the Mueller machine 22. Within the clamp 33 is a liner 36 (FIG. 3) which coacts with the rubber like sealing collar 32 and the Mueller machine 12 to provide an air tight seal between the Mueller machine 12 and the cylindrical stopper housing 20 of the inflatable gas pipeline stopper be. The sealing clamp 33 includes a clamp flange 34 having a plurality of bolts 35 for tightening the sealing clamp about the gas pipeline stopper be and the Mueller machine 12.

Also interconnected with the Mueller machine or other similar type machines 12 are brackets 95 as shown in FIG. 2 which interconnect with the eye bolt 17 and are held in place by bracket nuts 96. The brackets 95, for example, an L-bracket 95, receives an end of a stabilizing cord 94 from the cylindrical stopper housing 20 of the inflatable gas pipeline stopper be. The stabilizing cord is attached to the cylindrical stopper housing 20 by means of a stabilizing collar 90. The stabilizer collar 90 includes stabilizing collar semi-circular fittings 92 which extend about the housing, and opposing ears 91 extending therefrom. The stabilizing collars 90 are secured about the cylindrical stopper housing 20 by means of stabilizing collar bolts 97 extending through opposing ears 91. Removable stabilizer pins 93 extend between the stabilizing collar ears 91 for receiving the stabilizer cord 94. Accordingly, the stabilizer cord 94 is secured between an upper end of the cylindrical stopper housing 20 and the Mueller machine 12 to stabilize the inflatable gas pipeline stopper be with respect to the Mueller machine 12.

FIGS. 2 and 3 are cross-sectional views of the inflatable gas pipeline stopper 10 of the present invention engaged with Mueller machine 12 and inserted into gas pipeline stopper 11, for stopping flow of gas through pipeline 11. Accordingly, cylindrical stopper housing 20 is inserted into Mueller machine 12 such that insertion tip 30 (FIG. 1) attached to reducer 28 extends through a hole tapped in gas pipeline 11. A rubber like seal collar 32 on cylindrical stopper housing 20 contacts the upper edge of the Mueller machine 12. Sealing clamp 33 extends about the cylindrical stopper housing 20 and the rubber like seal collar 32 and an upper portion of the Mueller machine 12 to provide an airtight seal between the cylindrical stopper housing 20 and the Mueller machine. Liner 36 is positioned to fit within the sealing clamp 33 to further provide for an airtight seal, and the sealing clamp 33 is clamped down via clamp bolts 35 through clamp flange 34 to secure the clamp around the cylindrical stopper housing 20 and the Mueller machine 12 to provide an air tight fit. It should also be noted that any means known in the art for providing an air tight fit between the housing 20 and the .Mueller machine 12 are considered within the scope of this invention. Further, any connection means known in the art for connecting the cylindrical stopper housing 20 to the pipe, including any such means besides a Mueller machine, is within the scope of this invention.

As shown in FIG. 3, initially the air bags 60 are retracted in the cylindrical stopper housing 20 prior to stopping the pipe 11 and during the insertion of the cylindrical stopper housing 20 into the Mueller machine 12 and insertion tip 30 into the gas pipeline 11. The air bags may be any air bags known in the art, but are preferably air bags constructed in accordance with the teachings of copending United States Application Ser. No. 08/176,043 dated Dec. 30, 1993, by Petrone, the entire disclosure of which is incorporated herein by reference. Such air bags are directional in nature, having a rigid member within the air bag for pointing the air bag in a desired direction, and accordingly, one air bag 60 is positioned to point upstream and the other air bag 60 is positioned to downstream. As hereinbefore set forth, directional indicators 48 on the moveable bag inserting and retracting plunger assemblies 40 are positioned to indicate the direction that the air bags 60 are pointed when they are ejected into the gas pipeline. The air bags 60 are impervious to fluid flow and when inflated within the pipeline 11 block flow of gas through the gas pipeline.

As shown in FIG. 3, the air bags 60 are positioned along side each although, preferably, the air bags 60 are positioned one above the other, i.e. the upstream air bag 60 is positioned above the downstream air bag 60 in the housing. As such, the downstream air bag 60 can be inserted into the gas pipeline 11 first and inflated to block off the flow of gas through the gas pipeline 11, and then the upstream air bag 60 can be inserted into the pipeline 11 and inflated to coact with the first air bag 60 to prevent the flow of gas through the gas pipeline 11.

The air bags 60 are ejected into the gas pipeline 11 via the moveable bag inserting and retracting plunger assemblies 40. Moveable bag inserting and retracting plunger assemblies 40 are controlled by handles 70 which extend along the exterior sides of the cylindrical stopper housing 20. Accordingly, as the handles 70 are moved from the position in FIG. 3 to the position shown in FIG. 4, the moveable bag inserting and retracting plunger assemblies and the rigid air pipes 40 are brought down therewith and the air bags 60 are inserted into the gas pipeline 11 wherein they are inflated through valves 42 of the removable inflating and deflating and pressure monitoring assembly 42A. The air bags 60 are interconnected with the rigid air pipes 40 in any manner known in the art such as by air bag connector.

When the air bags 60 are ejected into the gas pipeline the handles 70 may be locked down via positioning bolt 75 extending through positioning apertures 74 in the handle collar ears 81 and through the apertures 74 in the handle 70. Further, it should be noted, that when the moveable bag inserting and retracting plunger assemblies are retracted within the cylindrical stopper housing the handles 70 can likewise be locked in a similar manner, the attachment of the handles 70 to the rigid air pipes 40 being adjustable along the rigid air pipes 40 by movement of the upper and lower moveable bag inserting and retracting plunger assemblies stop collars 50 and 52.

This inflatable gas pipeline stopper of this invention inserts two inflatable directional air bag type pipeline stoppers, one upstream and the other downstream, into a steel, cast iron or plastic gas pipeline. Additionally, this invention vents any gas escaping past the upstream air bag into the atmosphere. Further, drilling and tapping only one hole in the gas pipeline is necessary to accomplish this. Previous to this invention three separate holes had to be drilled and tapped into the gas pipeline at each side of a broken gas pipe.

The inflatable gas pipeline stopper of the present invention includes a gas-tight cylindrical stopper housing 20 with a venting port. Its base is adapted to fit all the Mueller Co. Drilling & Tapping Machines, as well as the Drisco Plastic Pipe Branch Service Tee or any drilling and tapping machines sold by other manufacturers, by means of a quickly removable gas-tight adaptor clamp which encircles the cylindrical stopper housing 20. The gas-tight clamp are designed to be compatible with, and can be easily attached to, the Drisco Plastic Pipe Branch Service Tee as well.

Figure 5:
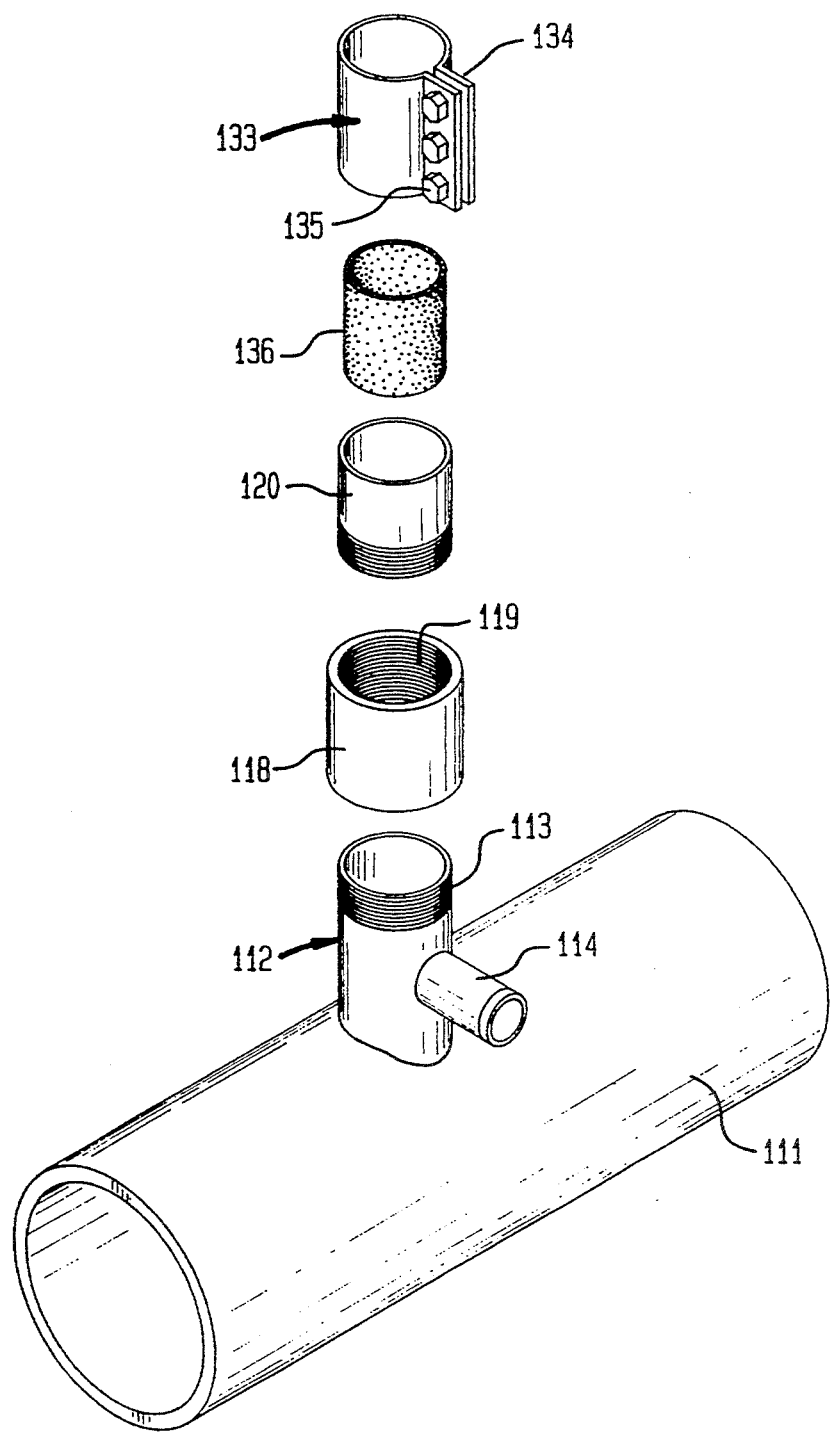
FIG. 5 is an exploded perspective view of the components of the attachment means for attaching the gas pipeline stopper of the present invention shown in FIG. 1 to a plastic gas pipeline.

Referring to FIG. 5, the Drisco Plastic Pipe Service Tee 112 is fused onto the plastic gas pipeline at the point where the stop-off is to be made and a hole is drilled therethrough into the gas main. The adaptor for Drisco Plastic Pipe adaptor 118 comprises a plastic coupling having internal threads 119. The adaptor 118 is manually threaded to the external threads 113 of the tee 112 through which the inflatable air bags are inserted into the plastic gas main 111. Threaded into the other end of the plastic coupling 118 is a short length of pipe 120 having the same diameter as the inflatable gas pipeline cylindrical stopper housing After being threaded into the plastic coupling, this pipe protrudes a short distance thereabove. The gas inflatable pipeline cylindrical stopper housing 20 is then attached to this pipe 120 by means of a gas tight clamp 133 which encircles both the housing and the pipe 120 thereby holding the entire assembly securely to the plastic branch tee 112. The clamp 133 includes a flange 134 with bolts 135 extending therethrough for tightening clamp 133 about the housing and the pipe 120. A rubber liner 136 may be used to effect an air tight seal between the cylindrical stopper housing 20 and the pipe 120. Operation of the inflatable gas pipeline stopper for stopping a plastic gas pipeline is the same as with the operation for a steel or cast iron gas pipeline as hereinbefore described.

The air bags 60 used with the inflatable gas pipeline stopper of the present invention are fully collapsible, inflatable, directional bag-type pipe stoppers which are removable and replaceable in order to accommodate different size diameter gas pipelines. These bags are described in co-pending U.S. Application Ser. No. 08/176,043 filed on Dec. 30, 1993, to Petrone, the entire disclosure of which is incorporated herein by reference.

Since the upper end of the moveable bag inserting and retracting plunger assemblies are long and extend above the gas main being stopped off, it is somewhat difficult and awkward to raise and lower them. Furthermore, considerable upward force must be exerted on the moveable bag inserting and retracting plunger assembly in order to remove the partially deflated air bags from the gas pipeline and to reinsert them into the housing when the stop off is completed. In order to overcome these two problems, external to the cylindrical stopper housing 20 and attached to both rigid air lines 40 are two vertically adjustable moveable bag inserting and retracting plunger assembly collars 50 and 52 which position and lock an external handle mechanism that slides vertically along the exterior of the gas-tight cylindrical stopper housing 20 thereby facilitating the movement of the moveable bag inserting and retracting plunger assembly from the base of the cylindrical stopper housing 20.

One of the safety standards in the gas industry requires that a tap hole drilled into a steel or cast iron gas pipeline cannot be any larger than 25% of the nominal diameter of the pipe being tapped except for pipe sizes of 2" & 3" in diameter. Rather than having an entire inserting device for each size gas main, it is more cost effective to have a series of small removable reducers 28 and insertion tips 30 which reduce the cylindrical stopper housing 20 at its base where the air bags are ejected into the gas pipeline to the proper tap hole required for the size pipe being worked on. Accordingly, these reducers are employed for the various size tap holes. These reducers are easily removable from the cylindrical stopper housing 20 housing since they are manually threaded thereon. The inflatable bag inserting devices currently on the market, such as the Garner Goodman Stopper, and other patented devices all require a completely different size inserting cylinders for each size gas main. This feature of the invention is, therefore, more cost effective.

This invention provides for a commercially available venturi-type vacuum pump to be connected to the rigid air lines 40 at the quick disconnect coupling at the top thereof. The base of the venturi vacuum pump is fitted with the male part of the quick disconnect coupling and the other end of the pump is fitted with a long air hose. The venturi pump creates a vacuum by forcing air across the air line. Thus, a vacuum is created at the other end of the air bag which is attached to the moveable bag inserting and retracting plunger assembly 40 to rapidly deflate the air bags. This quick deflation of the air bags requires much less upwards force to be exerted on the moveable bag inserting and retracting plunger assembly 40 in order to retract the air bags into the cylindrical stopper housing 20 when the stop off is completed, thereby making this operation much easier. Furthermore, much less time is required to retract and deflate the air bags as well as reducing the strain and stress exerted on them during this operation.

The method of using the inflatable gas pipeline stopper of the present invention comprises numerous steps. First, before use, the stopper apparatus must be prepared through the following steps:

1. selecting the correct diameter air bag for use in the gas main to be stopped off;
2. extending both moveable bag inserting and retracting plunger assembly through the cylindrical stopper housing until the threaded ends of the moveable bag inserting and retracting plunger assembly extend beyond the bottom of the housing;
3. attaching the deflated air bags onto both moveable bag inserting and retracting plunger assembly;
4. orienting the bags so that they point in opposite directions from the other;
5. adjusting the directional indicators to point in the same direction as the corresponding bag;
6. attaching the inflating and deflating pressure monitoring assembly to the top of each moveable bag inserting and retracting plunger assembly;
7. inflating each air bag sufficiently in order to make them round;
8. applying lubricant to the outside diameter of each air bag in order to facilitate its withdrawal into the cylindrical stopper housing;
9. deflating the bags;
10. withdrawing the bags completely into the cylindrical stopper housing, by means of the handles, until the bags are positioned one above the other within in the cylindrical stopper housing; and
11. adjusting the moveable bag inserting and retracting plunger assembly stop collars on the rigid air lines to correspond to the distance the air bags must be plunged down into the gas pipe.

Attaching the Mueller machine or other similar type machines to the gas main comprises the steps of:

1. attaching the Mueller Drilling and Tapping Machine to the Gas Main by fastening the chains around the gas main;
2. attaching the chains to bolts on the ears of the Mueller machine;
3. attaching stabilizer cords to the Mueller machine;
4. drilling and tapping a hole the gas main; and
5. closing the working chamber slide valve on the Mueller machine after drilling and tapping the hole to prevent any gas from escaping.

The method of inserting the housing into the Mueller machine or other similar type machines comprises the steps of:

1. sliding the sealing clamp onto the housing;
2. attaching the proper size reducer and insertion tip to the base of the housing;
3. sliding the sealing clamp onto the Mueller machine;
4. fitting the rubber liner into the sealing clamp;
5. opening the working chamber slide valve on the Mueller machine;
6. seating the reducer adaptor into the tap hole in the gas main;
7. tightening the bolts on the clamp to attach the housing to the Mueller machine;
8. fastening the stabilizer cord to the housing;
9. inserting the downstream air bag into the gas main by pushing downward on the handle of the proper plunger assembly;
10. inflating the downstream air bag to the recommended pressure;
11. inserting the upstream air bag into the gas main by pushing downward on the handle of the proper moveable bag inserting and retracting plunger assembly;
12. inflating the upstream air bag to the recommended pressure; and
13. opening the venting valve located on the cylindrical stopper housing.

The method of removing the gas bags from the gas main comprises the steps of:

1. engaging the clamps on the moveable bag inserting and retracting plunger assembly so that the handles engage the moveable bag inserting and retracting plunger assembly;
2. deflating the upstream gas bag first by disengaging the inflate/deflate, pressure monitoring assembly from the moveable bag inserting and retracting plunger assembly and by attaching a venturi pump to the air lines to deflate the air bag;
3. repeating Steps 1-2 to deflate and remove the downstream air bag from the gas main; and
4. retracting the air bags into the cylindrical stopper housing by pulling upward on the proper handle of the moveable bag inserting and retracting plunger assembly.

The method of removing the inflatable gas pipeline stopper from the Mueller machine or other similar type machines comprises the steps of:

1. disconnecting the stabilizing cords;
2. loosening the bolts on the clamp;
3. removing the cylindrical stopper housing from the Mueller machine;
4. closing the slide valve of the Mueller machine to prevent gas from escaping; and
5. inserting a tap hole plug into the gas main. Modifications of the foregoing may be made without departing from the spirit and scope of the invention. What is desired to be protected by Letters Patents is set forth in the appended claims.

What is claimed is:

1. An inflatable gas pipeline stopper for stopping flow of gas through a gas pipeline comprising:
    a stopper housing having a top and a bottom;
    a pair of rigid air pipes extending into the stopper housing through the top of the housing, the rigid air pipes having upper ends connected to air sources and lower ends;

an inflatable air bag attached to the lower ends of each of the rigid air pipes within the stopper housing;

handle means interconnected with the rigid air pipes for inserting and retracting the rigid air pipes through the stopper housing to insert the air bags into a gas pipeline;

connection means for connecting the stopper housing to a hole tapped in a gas pipeline.

2. The apparatus of claim 1 wherein both air bags are directional and one is inserted upstream and the other is inserted downstream into a gas pipeline through a single hole tapped in the gas pipeline.

3. The apparatus of claim 2 wherein the stopper housing includes a vent means for providing a vent between the air bags, through the single hole tapped in a gas pipeline through which the inflatable air bags are inserted.

4. The apparatus of claim 3 further including adjustable clamps on the rigid air pipes for adjustably clamping the handle means to the rigid air pipes.

5. The apparatus of claim 4 wherein the rigid air pipes include directional indicators for indicating the direction of the air bags.

6. The apparatus of claim 5 including stabilizing cords extending from the stopper housing to the connection means for stabilizing the stopper housing.

7. The apparatus of claim 6 wherein the connection means comprises a seat for the stopper housing and a clamp comprising a sealing liner and means for tightening the clamp about the stopper housing and the seat.

8. The apparatus of claim 7 further including a removable reducing means and insertion tip at the bottom of the stopper housing for adapting the stopper housing for use with various size apertures and gas pipelines.

9. An inflatable gas pipeline stopper comprising:

a stopper housing have first and second ends, the first end having apertures and the second end carrying an insertion tip;

a pair of rigid air pipes extending into the apertures of the housing, the rigid air pipes having first and second ends, the first end having an air intake valve for receiving air from an air source and the second end having bag attachment means for attaching air bags thereto;

handles interconnected with the rigid air pipes, the handles extending along opposing external sides of the stopper housing for moving the rigid air pipes with respect to the housing;

handle guides interconnected with the stopper housing for guiding the movement of the handles along the stopper housing;

adjustable collars means on the rigid air pipes for adjustably coupling the handles to the rigid air pipes in a fixed position;

air bags attached to the second end of the rigid air pipes;

the stopper housing insertion tip positioned in an aperture of a gas pipeline and the air bags inserted into the gas pipeline and inflated to stop the flow of gas through a gas pipeline.

10. The apparatus of claim 9 wherein the air bags are directional and one air bag is directed to extend upstream into the pipeline and the other is directed to extend downstream into the pipeline, the air bags extending through a single hole in a gas pipeline.

11. The apparatus of claim 10 further including a venting means interconnected with the stopper housing for venting gas between the upstream and downstream air bags, through the single hole tapped in a gas pipeline through which the inflatable air bags are inserted.

12. The apparatus of claim 11 wherein the air intake valves further include air pressure gauges for indicating the pressure of air in the air bags.

13. The apparatus of claim 12 wherein the rigid air pipes include directional indicators for indicating the direction of the air bags.

14. The apparatus of claim 13 including stabilizing cords extending from the stopper housing to stabilizer attachment means for stabilizing the stopper housing.

15. The apparatus of claim 14 wherein the attachment means comprises a seat for the stopper stabilizer housing and a clamp comprising a sealing liner and means for tightening the clamp about the housing and the seat.

16. The apparatus of claim 15 further including a removable reducing means and insertion tip at the bottom of the stopper housing for adapting the stopper housing for use with various size apertures and gas pipelines.

17. A method of stopping gas flowing through a broken gas pipeline comprising the steps of:

drilling and tapping a hole in a gas pipeline;

attaching a gas pipeline stopper housing to the aperture drilled and tapped into the gas pipeline, the attachment between the gas pipeline stopper housing and the gas pipeline being air tight;

inserting two air bags from stopper housing into the gas pipeline, one air bag inserted in an upstream direction of the pipeline and the other air bag inserted in a downstream location of the gas pipeline;

inflating the air bags to stop the flow of gas through a gas pipeline.

18. The method of claim 17 further comprising venting gas that passes the upstream air bag from between the air bags through the stopper housing by a vent interconnected with the stopper housing through the hole tapped in a gas pipeline through which the inflatable air bags are inserted.

19. The method of claim 18 further comprising a step of attaching a reducer and insertion tip to the stopper housing for extending the stopper housing through the hole drilled and tapped into the gas pipeline to prevent the air bags from contacting the rough edges of the hole drilled and tapped in the gas pipeline.

20. The method of claim 19 further comprising the step of deflating the air bags by attaching venturi pumps to the rigid air pipes leading to the air bags to quickly deflate the air bags.

* * * * *